US006553432B1

(12) United States Patent
Critz et al.

(10) Patent No.: US 6,553,432 B1
(45) Date of Patent: Apr. 22, 2003

(54) METHOD AND SYSTEM FOR SELECTING IDE DEVICES

(75) Inventors: Christian L. Critz, Round Rock, TX (US); Greg R. Fiebrich, Georgetown, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/427,437

(22) Filed: Oct. 26, 1999

(51) Int. Cl.$^7$ ............................. G06F 13/10; G06F 9/24
(52) U.S. Cl. ................. 710/10; 710/74; 710/8; 713/1; 713/2; 713/100
(58) Field of Search ................. 713/1, 2, 100; 710/8, 10, 74

(56) References Cited

U.S. PATENT DOCUMENTS

| | | | | |
|---|---|---|---|---|
| 5,239,445 A | | 8/1993 | Parks et al. ............... 361/729 |
| 5,448,741 A | * | 9/1995 | Oka ........................... 710/10 |
| 5,590,338 A | | 12/1996 | Parks et al. ............... 395/742 |
| 5,649,233 A | * | 7/1997 | Chen ......................... 710/134 |
| 5,729,767 A | | 3/1998 | Jones et al. ............... 395/882 |
| 5,740,386 A | | 4/1998 | Miller et al. ............... 395/308 |
| 5,742,794 A | | 4/1998 | Potter ....................... 395/500 |
| 5,761,460 A | | 6/1998 | Santos et al. ............. 395/309 |
| 5,768,622 A | | 6/1998 | Lory et al. ................. 395/855 |
| 5,822,582 A | * | 10/1998 | Doragh et al. ............ 709/321 |
| 5,909,592 A | | 6/1999 | Shipman ................... 395/830 |
| 5,911,084 A | | 6/1999 | Jones et al. ............... 395/882 |
| 6,016,518 A | * | 1/2000 | Matsushima et al. .... 709/208 |
| 6,067,618 A | * | 5/2000 | Weber ....................... 713/1 |
| 6,088,794 A | * | 7/2000 | Yoon et al. ................ 713/2 |
| 6,317,828 B1 | * | 11/2001 | Nunn ......................... 713/2 |
| 6,460,099 B1 | * | 10/2002 | Stryker et al. ............ 710/74 |

OTHER PUBLICATIONS

"An IDE Device Configuration Scheme with Reset Signal", Jan. 1999, IBM Research Disclosure, RD 417108, pp. 147–149.*

Paul J. Maia, "*Method and Apparatus for Determining the Drive Letter Assignment of a CD–ROM Drive During Initial System Setup of a Computer System*", Jan. 12, 1999; Ser. No. 09/237,644. (Copy not enclosed.) Now US Pat. No. 6,370,641.

* cited by examiner

Primary Examiner—Christopher B. Shin
Assistant Examiner—Ilwoo Park
(74) Attorney, Agent, or Firm—Baker Botts L.L.P.

(57) ABSTRACT

A method which includes selecting a boot device priority sequence, and configuring—in response to the boot device priority sequence—an I/O controller such that a MASTER or SLAVE designation of at least one IDE device conforms to the boot device priority sequence. A computer system which includes at least one printed circuit board operably connecting at least one processor, at least one memory, at least one I/O controller, and at least one IDE controller; at least one IDE bus operably connecting at least two IDE device connectors with the at least one IDE controller; and at least one cable select signal pin of each of the at least two IDE device connectors operably coupled to the at least one I/O controller.

13 Claims, 11 Drawing Sheets

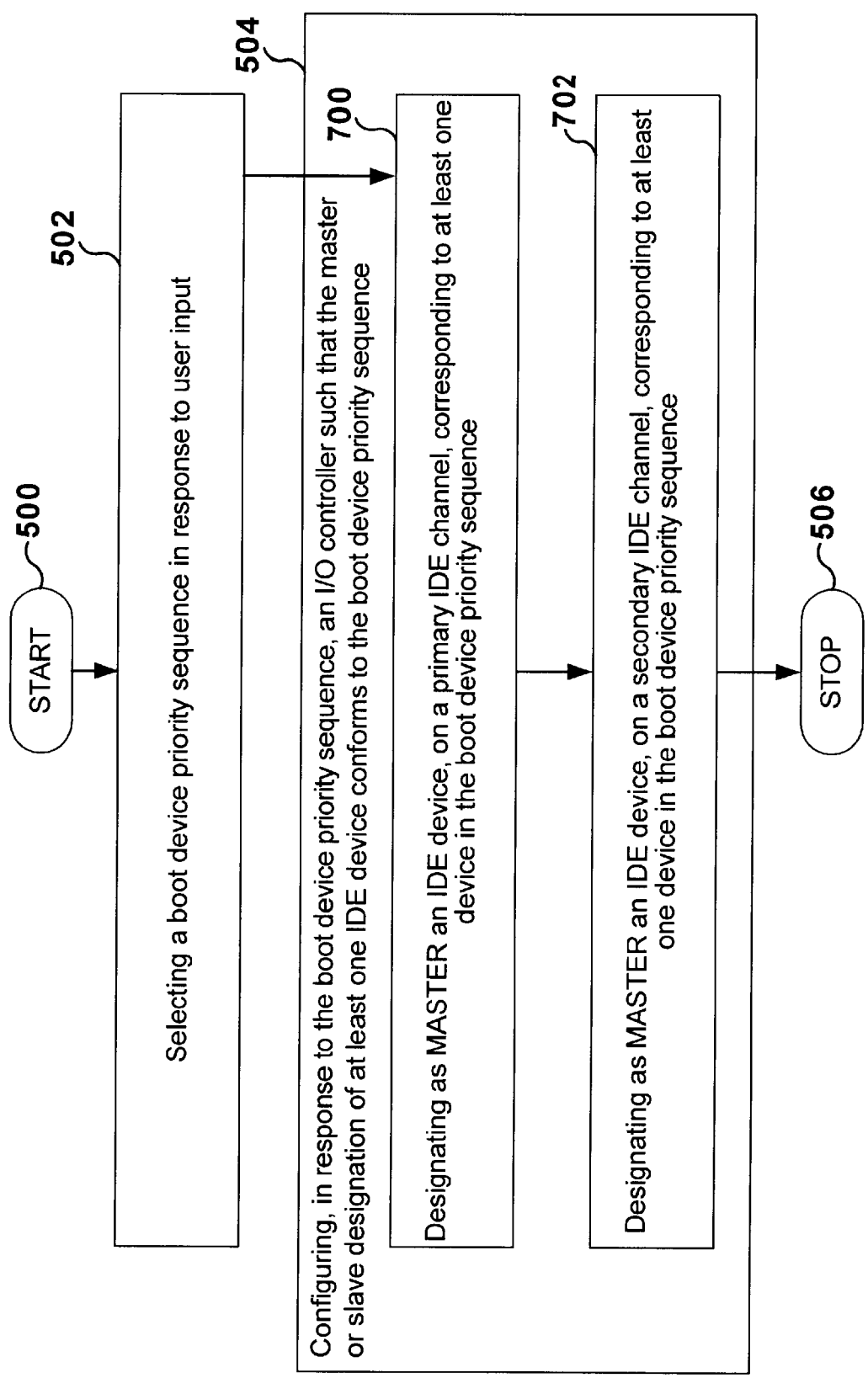

METHOD AND SYSTEM FOR SELECTING IDE DEVICES

BACKGROUND OF THE INVENTION

1. Field of the Invention

The present invention relates, in general, to data processing systems.

2. Description of the Related Art

Data processing systems are systems that manipulate, process, and store data and are notorious within the art. Personal computer systems, and their associated subsystems, constitute well known species of data processing systems.

Personal computer systems typically include a motherboard for mounting at least one microprocessor and other application specific integrated circuits (ASICs), such as memory controllers, input/output (I/O) controllers, and the like. Most motherboards include slots for additional adapter cards to provide additional function to the computer system. Typical functions that a user might add to a computer include additional microprocessors, additional memory, fax/modem capability, sound cards, graphics cards, or the like. The slots included on the motherboard generally include in-line electrical connectors having electrically conductive lands which receive exposed tabs on the adapter cards. The lands are connected to wiring layers, which in turn are connected to a bus that allows the cards to communicate with the microprocessor or other components in the system.

A personal computer system may include many different types of buses to link the various components of the system. Examples of such buses are a "local bus" which connects one or more microprocessors to the main memory, an Industry Standard Architecture (ISA) bus for sound cards and modems, a Universal Serial Bus (USB) for pointing devices, scanners, and digital cameras, a Fire Wire (IEEE-1394) for digital video cameras and high-speed storage drives, and a Peripheral Component Interconnect (PCI) bus for graphics cards, SCSI adapters, sound cards, and other peripheral devices such as isochronous devices, network cards, and printer devices.

Before a personal computer is powered on, it is a dead collection of components such as the ones listed above. When the personal computer is powered on, a small burst of electricity is sent to the main system processor. This small burst of electricity clears the registers of the main system processor and starts the boot process. The first step in the boot process is for the PC to ensure that all major components of the PC are functioning correctly, which is accomplished by running a set of computer codes known collectively as the Power On Self Test (POST) routines, which insure that, at least from a hardware aspect, all major system components (including the main processor itself) are functioning normally.

The POST routines are actually the first-executed routines of a larger set of routines known collectively as the Basic Input Output System (BIOS). The BIOS is a collection of routines built into a PC that handle the most fundamental tasks of sending data from one part of the PC to another. Since a very important part of sending and receiving data is to ensure that the units sending and units receiving data are functioning correctly, the very first thing the BIOS does is to invoke and run the POST routines.

As noted, the BIOS routines are substantially permanently built in to the PC. Consequently, the BIOS routines are limited in size and scope. Accordingly, after the BIOS ensures that all major components of the data processing system are operating properly (via its POST routines), the BIOS initiates a process which ultimately results in the loading of an operating system from disk storage.

To do this, the BIOS routine begins searching through the PC's disk drives (e.g., disk drives A, B, and C), looking for a disk containing specific data, known as a boot record. The boot record is a very small program which initiates the loading of system files which will ultimately result in a fully operational computer system. Once the BIOS locates the boot record, it loads it into the PC's memory at a certain memory address. Thereafter, the BIOS passes control to the boot record by branching to that certain memory address.

The boot record initiates a series of events involving the loading and executing of many programs. This series of events typically determines the presence of all hardware resources available to the PC, correctly configures those hardware resources, resolves any resource allocation problems, loads or shadows the BIOS from permanent storage into RAM, and supplements the BIOS in RAM with small programs, known as device drivers, when a hardware component present is either not recognized or is some variation of a component ordinarily recognized by the BIOS (remember the BIOS is "built in" so its contents are limited and inflexible). Finally, the series of events initiated by the boot record culminates in the loading and execution of a collection of programs known as the "operating system."

The operating system serves as a sort of interpreter between application programs and the BIOS. PC components (e.g., a printer) consist of electrical circuits and mechanical linkages which perform certain tasks. However, as is well known, PCs are operated and controlled by computer programs, which are long series of symbolic instructions which direct the PC to do something (e.g., print a document on a printer). The BIOS is the entity that translates computer programs into the electrical signals necessary to make the electrical and mechanical linkages of PC components perform desired tasks.

To do this, the BIOS, receives and transmits computer program codes at a first interface with the operating system, and receives and transmits electrical circuit signals at a second interface with the electrical circuits of the PC components to be controlled and/or interacted with. The BIOS is often called firmware to denote its status halfway between hardware and software.

The operating system serves as an interpreter between applications programs and the BIOS, because insofar as the BIOS is logically very close to the PC hardware, the software codes of the BIOS (possibly supplemented by one or more device drivers) are closely constrained and related to the actual architecture of the hardware. Given that there are many competing vendors of hardware, with each piece of hardware having its own BIOS/device driver requirements, in the absence of an operating system, a system application (e.g., a web-browser, database, or word processor application) programmer would have to be aware of and program for the BIOS/device drivers present on a particular machine or platform. Fortunately, this is not the case. Instead, certain companies (e.g., Microsoft, Apple, and Linux) have cooperated with hardware vendors and have created intermediary programs, known as operating systems, which overlay and interact with the BIOS/device drivers present within a system. The operating system manufacturers present to the applications programmer a standardized set of interface programming protocols or conventions (e.g., protocols for copying a file to disk storage or deleting a file from disk storage). When an operating system is in use, an application programmer merely requests certain functions of the operating system, and the operating system takes over from there, handling the details involving the BIOS/device drivers.

As has been mentioned, the fact that a BIOS is built in assures that the BIOS is limited and inflexible. For various reasons, the BIOS, which is relatively standard within the industry, is not something which is changed on a regular basis. Accordingly, when changes in hardware occur which require capabilities beyond the built-in BIOS, the BIOS is typically supplemented by the use of device driver programs under the control of an operating system.

One situation in which this extension of the BIOS is done involves disk storage. When the industry standard BIOS was written, there were basically only three disk drives envisioned: A drive, B drive, and C drive. Accordingly, industry standard BIOS is only written to handle the A-B-C triad of drives.

Recent times have seen a proliferation of drives above and beyond those in existence when the early A-B-C triad of drives was conceived. Examples of such drives are Compact Disk Read Only Memory Drives (CD-ROM drives) and Digital Video Disk Drives (DVD drives). Along with the proliferation of these newer drives has developed a desire to utilize these newer drives in conjunction with the old A-B-C triad.

Insofar as the industry standard BIOS has been written for only three drives, certain work-a rounds have been developed to extend the ability of PCs to access a number of drives beyond that provided for in their BIOSes. One such work-around is known as Integrated Drive Electronics (IDE).

IDE utilizes device drivers in conjunction with the operating system to expand the capability of the BIOS to access disk drives. Utilizing IDE, a PC can access and utilize up to four drives via a slot which in the past would only allow the access and utilization of one drive. That is, the operating system, working with an IDE controller built into the motherboard (main board) of the computer system allows the BIOS to write as if it were writing to a particular drive (e.g., a hard drive attached in a C drive slot). However, the operating system is working with the application program and notes that the application program actually desires access to a drive, which is one of four drives attached to the C drive slot via IDE connectors and circuitry. Accordingly, the operating system, working with the IDE controller, sends a control signal which selects the CD drive as "the" drive attached to the C drive slot. Accordingly, the BIOS can read and write to the drive in drive slot C and not have to concern itself with the fact that there are other drives also attached to the same slot.

IDE is relatively new, and as yet has not been fully utilized. Accordingly, a need exists in the art for methods and systems which expands the utilization of IDE.

SUMMARY OF THE INVENTION

A method and computer system have been invented which expand the utilization of IDE. The method includes selecting a boot device priority sequence, and configuring—in response to the boot device priority sequence—an I/O controller such that a MASTER or SLAVE designation of at least one IDE device conforms to the boot device priority sequence. The computer system includes at least one printed circuit board operably connecting at least one processor, at least one memory, at least one I/O controller, and at least one IDE controller; at least one IDE bus operably connecting at least two IDE device connectors with the at least one IDE controller; and at least one cable select signal pin of each of the at least two IDE device connectors operably coupled to the at least one I/O controller.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 7 shows a high-level logic flowchart depicting an embodiment of a process.

DESCRIPTION OF THE PREFERRED EMBODIMENT(S)

The following sets forth a detailed description of the best contemplated mode for carrying out the independent invention(s) described herein. The description is intended to be illustrative and should not be taken to be limiting.

Figure 1:
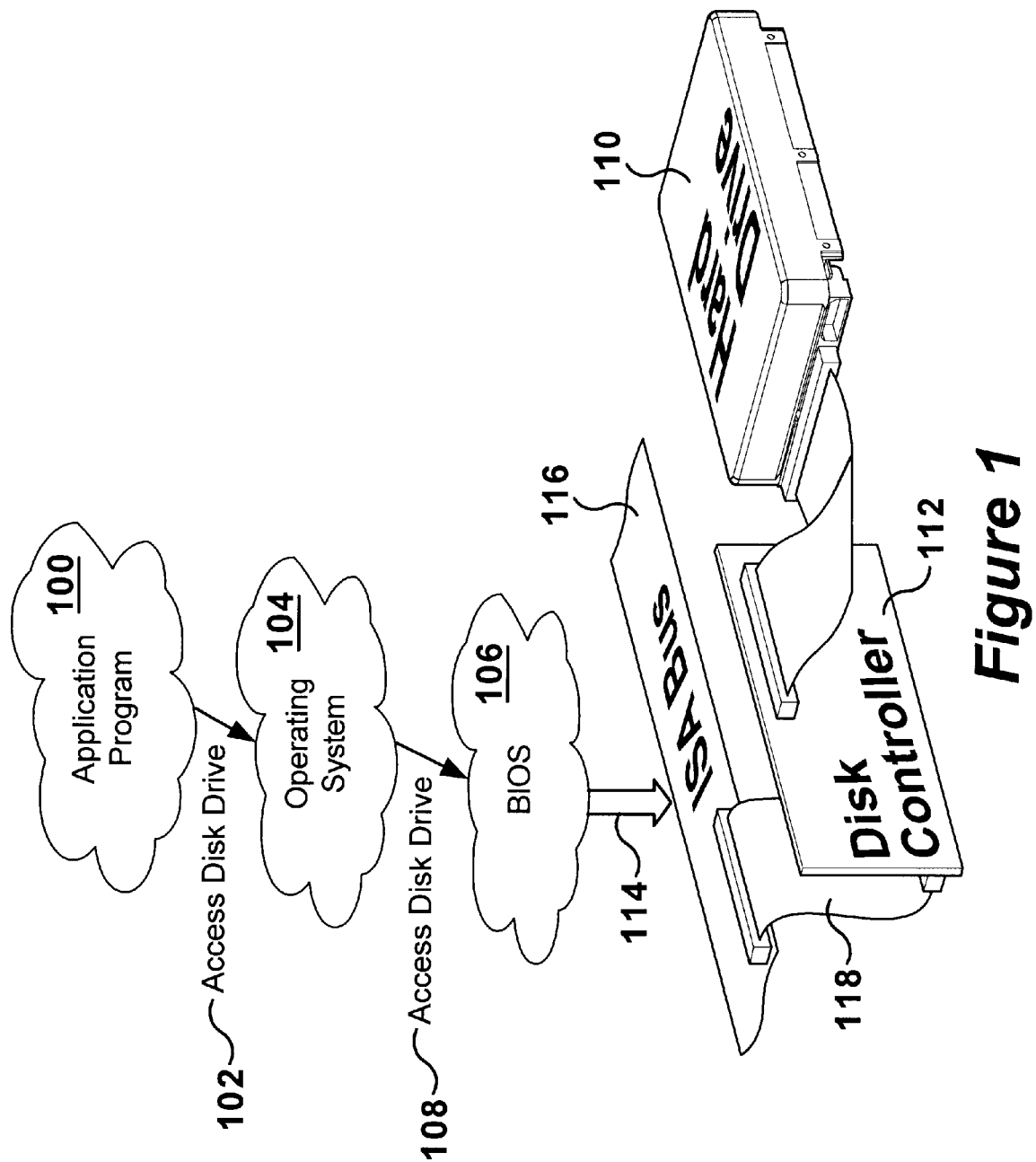
FIG. 1 shows a partially schematic diagram of a related-art predecessor to IDE, which serves as context for the introduction of IDE and its associated components.

With reference to the figures, and in particular with reference now to FIG. 1, shown is a related-art predecessor to IDE, which will serve as context for the introduction of IDE and associated components, below. Depicted is a partially schematic diagram of application program 100 (e.g., a word processing program) directing 102 operating system 104 (e.g., Microsoft's Windows) to access hard disk drive 110. Depicted is that operating system 104, using commands appropriate to BIOS 106, directs 108 BIOS 106 to perform the requested hard disk drive access. In response, BIOS 106 consults its built-in memory (not shown), retrieves the set of instructions appropriate to the hard disk drive 110, translates the disk access directed by the operating system to signals appropriate to the hard disk drive circuitry or electronics, which are depicted as embodied in disk controller electronics board 112, and passes 114 (via one or more intermediary controllers and buses (not shown) familiar to those within the art), through ISA bus 116 and cable 118, the instructions to disk controller electronics board 112. Thereafter, the disk controller electronics carry out the commands received from BIOS 106.

Figure 2:
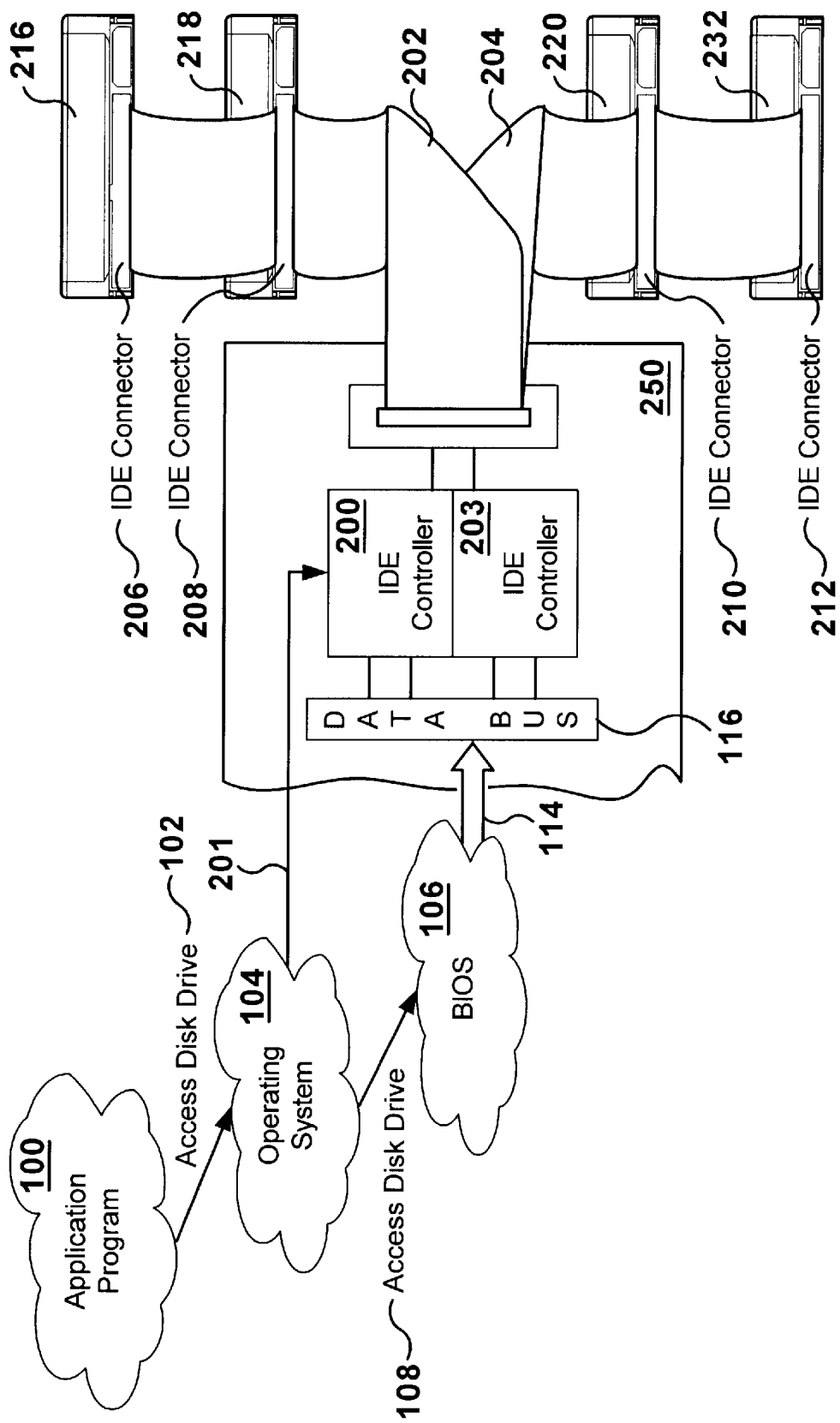
FIG. 2 depicts a partially schematic diagram of an application program (e.g., a word processing program) directing an operating system program (e.g., Microsoft's Windows) to access a hard disk drive as in FIG. 1, but doing so in an IDE environment.

Referring now to FIG. 2, shown is application program 100 (e.g., a word processing program) directing 102 operating system 104 (e.g., Microsoft's Windows) to access a hard disk drive, similar to the situation in FIG. 1, but doing so in an IDE environment. Depicted is that, in the IDE environment, there is no longer a separate board for the disk controller electronics. Instead, illustrated is that the disk controller electronics have been integrated into motherboard 250 as IDE controllers 200, 203.

Shown is IDE controller 200 built into motherboard 250, and connected to motherboard 250 hardware in such a way that the motherboard hardware sees the controller as a fictional ISA bus 116 expansion slot. Depicted is that IDE controller 200 interfaces with IDE 40-wire ribbon cable 202. Shown is that 40-wire ribbon cable 202 terminates in two IDE device connectors 206, 208, which are shown respectively connecting to IDE devices 216, 218. (As used herein the term "IDE device" can refer to any IDE compatible device, including but not limited to a hard disk drive, a compact disk drive, a digital video disk drive, a LS 120 drive, and a zip drive.) Depicted is that IDE controller 203 interfaces with 40-wire ribbon cable 204. 40-wire ribbon cable 204 terminates in two IDE device connectors 210, 212, which are shown respectively connecting to IDE devices 220, 232. As shown, with IDE, a PC can have up to four drives connected to an expansion bus slot that previously serviced only one drive.

Operating system 104, working in tandem with IDE controller 200, effects a work-around which allows BIOS 100 to function such that the presence of IDE controller 200 and its associated IDE devices 216, 218, 220, 232 are transparent to BIOS 106. In the IDE environment of FIG. 2, when application program 100 requests disk drive access to a specific IDE device, operating system 104 directs 108 BIOS 106 in substantially the same fashion as that discussed in FIG. 1. However, substantially simultaneously with directing BIOS 106 to access the IDE device, the operating system 104 will also inform 201 IDE controllers 200, 203 as to the actual IDE device which operating system 104 desires to access. IDE controller 200 controls 40-wire ribbon cable 202 and IDE controller 203 controls 40-wire ribbon cable 204. In response to the identity of the IDE device to be accessed, either IDE controller 200 or IDE controller 203 (whichever has control over the 40-wire ribbon cable that contains the device to be activated) activates either 40-wire ribbon cable 202 or 40-wire ribbon cable 204 (e.g., if the drive to be accessed were IDE device 216, IDE controller 200 would activate 40-wire ribbon cable 202). After activation of the appropriate 40-wire ribbon cable 202 or 204, the activating IDE controller (e.g., IDE controller 200 if IDE device 216 is to be accessed) will, utilizing a Cable Channel Select signal line (CSEL#) within the 40-wire ribbon cable, designate the IDE device to be accessed as MASTER, and designate the other IDE device on the activated 40-wire IDF ribbon cable as SLAVE. Under the IDE specification requirement, for each pair of devices on the same cable, one is configured as MASTER and the other as SLAVE; under the IDE specification, the MASTER device transmits and receives over the 40-wire cable, while the SLAVE waits passively and does not respond or interact with the business being transacted with the MASTER. Accordingly, the IDE scheme allows the two drives to share the 40-wire cable without confusion.

The present description utilizes an ISA bus scheme for clarity of presentation and ease of understanding. However, it is to be understood that the devices and processes described herein are not limited to ISA bus schemes but are instead applicable to all buses that use IDE in a fashion analogous to that described herein. For example, one embodiment of the devices and processes described herein can be achieved by utilizing a Southbridge (e.g., a PCI to ISA bridge) attached to a PCI bus to provide IDE access. However, insofar as from a logical standpoint the IDE devices and controllers still function substantially analogously to ISA bus expansion slots (the PCI to ISA bus bridge making the IDE devices appear "as if" they were ISA bus devices), the discussion herein utilizes the ISA architecture for sake of clarity and ease of understanding. Those skilled in the art will recognize that the devices and processes herein described are applicable to virtually all systems which utilize IDE, by straightforward extension, irrespective of the presence of intermedial components. For example, a second embodiment based on the ISA embodiment described herein can be achieved in a straightforward fashion by using a Northbridge, PCI bus, Southbridge architecture, with bus lines running to the IDE devices. However, note that from a logical systems view the addition of intermedial components (e.g., Northbridge, PCI bus, and Southbridge) between the processor and IDE devices is essentially transparent—the IDE devices still appear to be present as an ISA bus expansion slot—and thus such an embodiment is actually taught by the ISA bus architecture example described herein. Thus, it is to be understood that embodiments of the devices and processes described herein are not to be limited to ISA architecture buses.

One example of a technology area where IDE is particularly useful is in the area of portable computers, such as notebook, subnotebook, or smaller computers. It should be noted that when IDE is implemented in a notebook environment, rather than the IDE cables shown in FIGS. 1 and 2, a printed circuit board is imprinted with two collections of conductive metallic traces where each collection of traces functions as an IDE cable. Each collection of metallic traces which functions as an IDE cable will hereinafter be referred to as an "IDE bus." Consequently, as used herein the term IDE bus is also intended to also serve as an exemplar of an IDE cable, and thus the processes and devices discussed herein also prove useful in an IDE cable environment. In addition, when a term such as "IDE cable select signal" is used herein, it is to be understood that such a term will typically mean "IDE bus select signal" when the context of the discussion indicates that an IDE bus, rather than an IDE cable, is being discussed.

Figure 3:
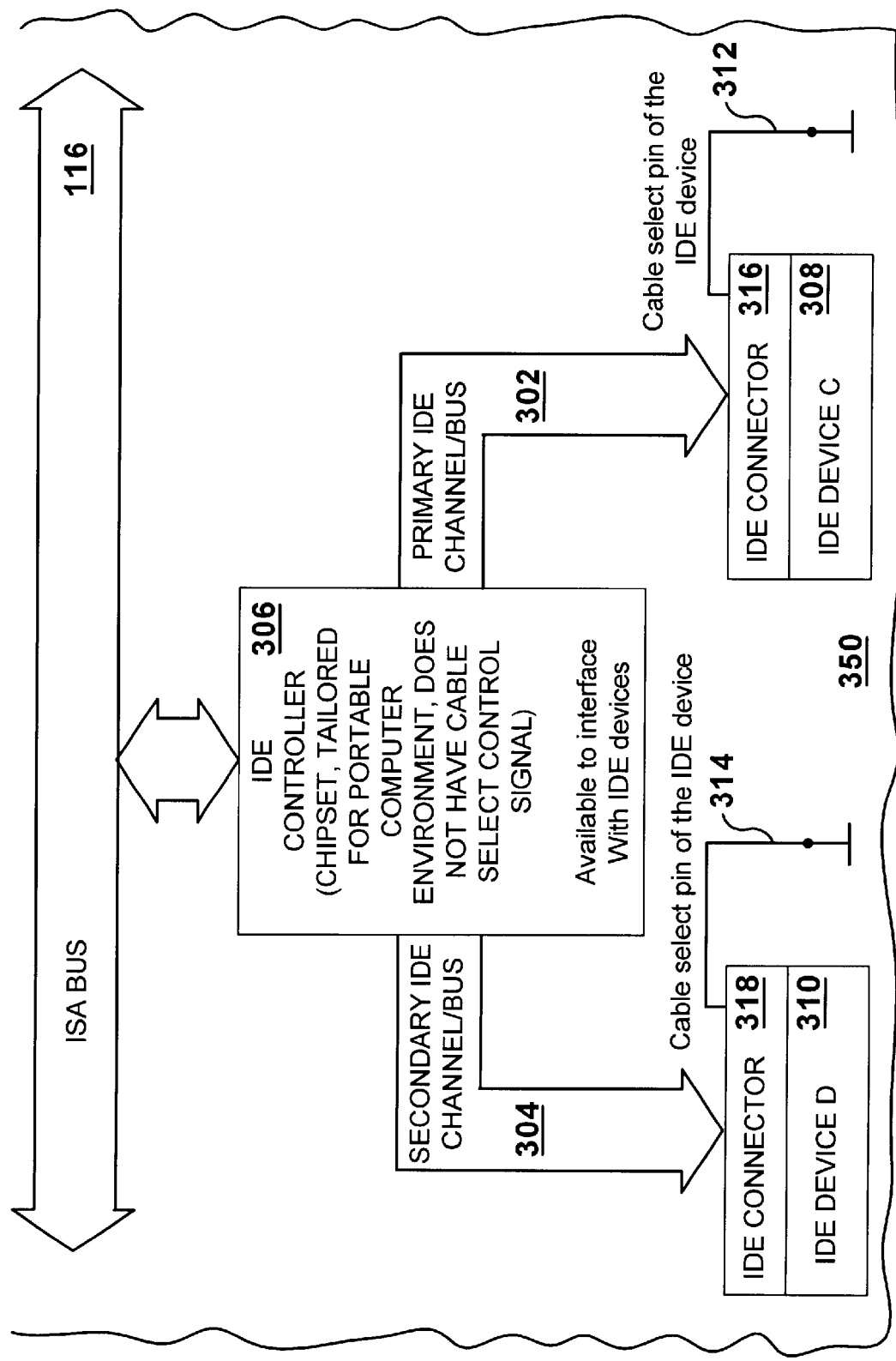
FIG. 3 illustrates a portion of motherboard 350 having primary IDE bus 302 and secondary IDE bus 304 under the control of IDE controller 306.

With reference now to FIG. 3, shown is a portion of motherboard 350 having primary IDE bus 302 and secondary IDE bus 304 under the control of IDE controller 306. As has been discussed, each IDE bus can support at least one MASTER and at least one SLAVE device. Historically, at least in the portable computer environment, it has been common to only require that the portable computer system provide the ability to boot from two devices. Accordingly, it has been common to utilize only one IDE controller 306, and to utilize the MASTER lines of IDE controller 306 to control a first, or primary drive on what is known in the art as a primary IDE channel (or equivalently a primary IDE bus when the MASTER portion of the wires of a 40-wire ribbon cable are implemented as IDE bus 302 via metallic traces on motherboard 350), and to utilize the SLAVE lines of the IDE controller to control a second, or secondary drive on what is known in the art as a secondary IDE channel (or equivalently a secondary IDE bus when the SLAVE portion of the wires of a 40-wire ribbon cable are implemented as IDE bus 304 via metallic traces on motherboard 350).

With IDE controller 306 so employed, IDE controller 306 is utilized such that the pinout for the normal cable channel select signal is utilized to control whether primary IDE bus 302 or secondary IDE bus 304 is enabled—since the cable channel select signal of IDE controller 306 is utilized to control activation of primary IDE bus 302 and secondary IDE bus 304, the cable channel select signal is not available to interface with and control IDE device C 308 and IDE device D 310 in the normal IDE fashion. Consequently, since under this scheme either IDE device C 308 or IDE device D 310 will only receive signals if the device is in fact the intended recipients of data (i.e., if either primary IDE bus 302 or secondary IDE bus 304 is respectively enabled), it is desired that IDE device C 308 and IDE device D 310 always respond when they receive data (because the IDE devices will only received data if their respective buses are enabled). Consequently, both IDE bus device C 308 and IDE bus device D 310 are permanently designated MASTER, which is generally accomplished, as is shown in FIG. 3, by permanently grounding channel select signal pin connections 312, 314 of the IDE connectors 316, 318 which respectively connect with the IDE channel select signal pins of IDE devices 308, 310 (those skilled in the art will appreciate that ordinarily an IDE device interprets a low on its cable channel select signal select pins as an indication that the IDE drive is MASTER).

As will be appreciated by those in the art, size and other design constraints in portable computer technologies often require that system components (e.g., a hard disk drive) be "hard wired" into the notebook itself. Because of this, when a consumer wants to upgrade to a newer, more capable drive, it is very difficult to replace the drive. In fact, up until recently it was often more cost effective for the consumer to purchase a new notebook rather than replace the drive. This situation tended to disenchant consumers, who sometimes prefer not to replace an entire computer when in fact they merely desire to replace a drive. In addition, some of the newer applications make it more advantageous to boot the system from one type of drive rather than another. Accordingly, the art is evolving to the point that it has become preferable to be able to boot a specific data processing system from more drives than currently available.

Unfortunately, in the current generation of portable computers it is very challenging to add new circuitry and components to the portable computers, due to, among other things, the fact that virtually every single portion of board real estate is being utilized. It is therefore apparent that a need exists to empower computer systems with the ability to selectively boot from several drives, but in such a way that a substantially minimal amount of hardware and software is required.

Figure 4:
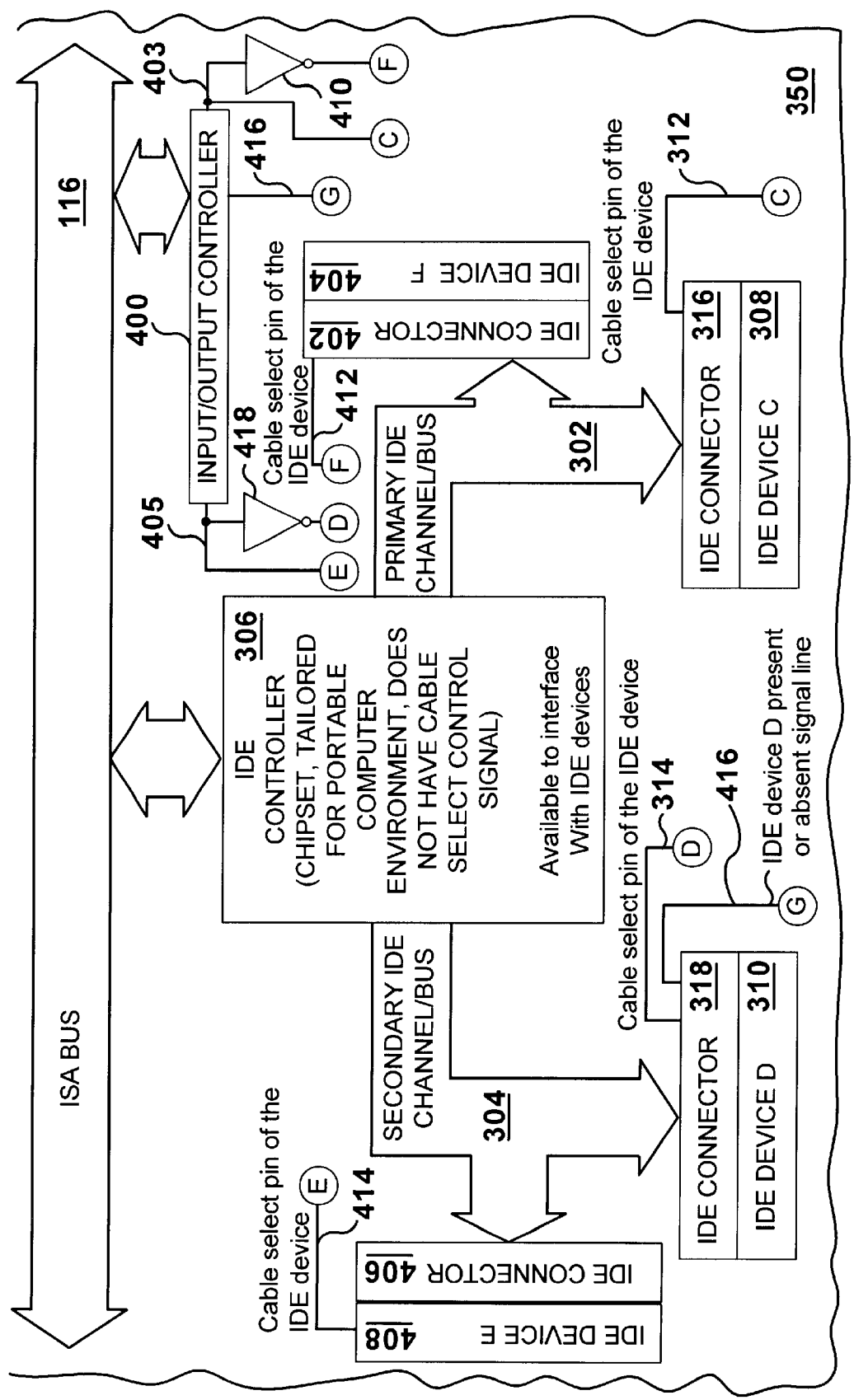
FIG. 4 shows a portion of motherboard 350 modified to have a circuit which will allow existing systems the ability to selectively boot from more than two IDE devices in such a way that a substantially minimum amount of hardware and software is required.

Referring now to FIG. 4, depicted is a portion of motherboard 350 modified to have a circuit which will allow existing systems the ability to selectively boot from more than two IDE devices in such a way that a substantially minimum amount of hardware and software is required. Illustrated is that the primary IDE bus 302 has been expanded to interface with an additional IDE connector 402, which supports IDE device F 404. Shown is that the secondary IDE bus 304 has been expanded to interface with an additional IDE connector 406, which supports IDE device E 408.

Ordinarily, in say a desktop computer environment where space is not limited, the situation depicted in FIG. 4 could be easily handled by adding a second IDE controller, and buses substantially commensurate with a second IDE 40-wire cable ribbon, and utilize the standard IDE protocol to control the additional devices. Unfortunately, this is not practicable in an environment where space is extremely constrained, such as a portable computer environment.

In a portable computer environment, as has been noted, board real estate is extremely limited, and thus it is very challenging, and indeed almost impossible, to add a second IDE controller and an attendant IDE cable to support additional drives. However, there is a desire in the industry to provide the ability to boot from the number of drives that could be booted from were a second IDE controller and cable present. Consequently, a need exists within the art regarding how to provide data processing systems with the ability to boot from more drives in the absence of a second IDE controller and cable.

It has been discovered that this problem can be resolved by using an I/O controller, already resident within the data processing system and under control of the system's operating system and BIOS, to provide the necessary control signals. As shown, I/O controller 400 has primary IDE bus control signal line 403 and secondary IDE bus control signal line 405. With respect to primary IDE bus control signal line 403, the primary bus control signal line 403 is directly connected with (a) cable channel select signal pin connection 312 of IDE connector 316 which connects with the IDE channel select signal pin of IDE device C 308, and with (b) the input of first inverter 410. The output of first inverter 410 is directly connected to cable channel select signal pin connection 412 of IDE connector 402 which connects with the IDE channel select signal pin of IDE device F 404. Consequently, when IDE device C is selected as MASTER, IDE Device F is simultaneously selected as SLAVE, and vice versa.

With respect to the secondary IDE bus control signal line 405, the secondary bus control signal line 405 is directly connected with (a) cable channel select signal pin connection 414 of IDE connector 406 which connects with the IDE channel select signal pin of IDE device E 408, and with (b) the input of second inverter 418. The output of second inverter 418 is directly connected to cable channel select signal pin connection 314 of IDE connector 318 which connects with the IDE channel select signal pin of IDE device D 310. Consequently, when IDE device E is selected as MASTER, IDE Device D is simultaneously selected as SLAVE, and vice versa.

The foregoing controls which devices on the secondary and primary IDE channels can be accessed. That is, when the BIOS goes out to search for a drive from which to boot, the foregoing scheme makes sure that the devices on the secondary and primary IDE buses that are bootable are those IDE devices selected as proper boot devices by a system user (such selection being done via interaction with a BIOS set up screen, as described below). The reason for this is that under the IDE standard only the bus selected as MASTER will "answer back" or respond to signals appearing on an IDE bus. Thus, by controlling which device is MASTER and which is SLAVE on an IDE bus, the foregoing scheme ensures that when a BIOS looks to boot the system through the IDE controller, the drive it sees on either the primary or secondary IDE channel will be that selected as MASTER, since the SLAVE will not return data in response to the BIOS queries and commands.

In some instances, an IDE device may be absent, in which case the system needs to be made aware of the fact. For example, IDE device D 310 might be a digital video disk drive contained within a removable module bay. Consequently, there may be instances in which the system will be powered on without the module bay present. In such a situation, I/O controller 400 would note the absence of the drive via IDE device D present or absent signal line 416, which is such that it signals the presence or absence of IDE device D 310. Therefore, this information could be used by BIOS 106 and/or operating system 104 to make sure that the only device on the secondary IDE bus 304 appearing as selectable would be IDE Device E 408.

The foregoing described circuitry of FIG. 4 is an example of specific circuitry that can be used to carry out a more general method. This more general method will now be discussed in relation to FIGS. 5, 6A, 6B, 7, 8, and 9.

Figure 5:
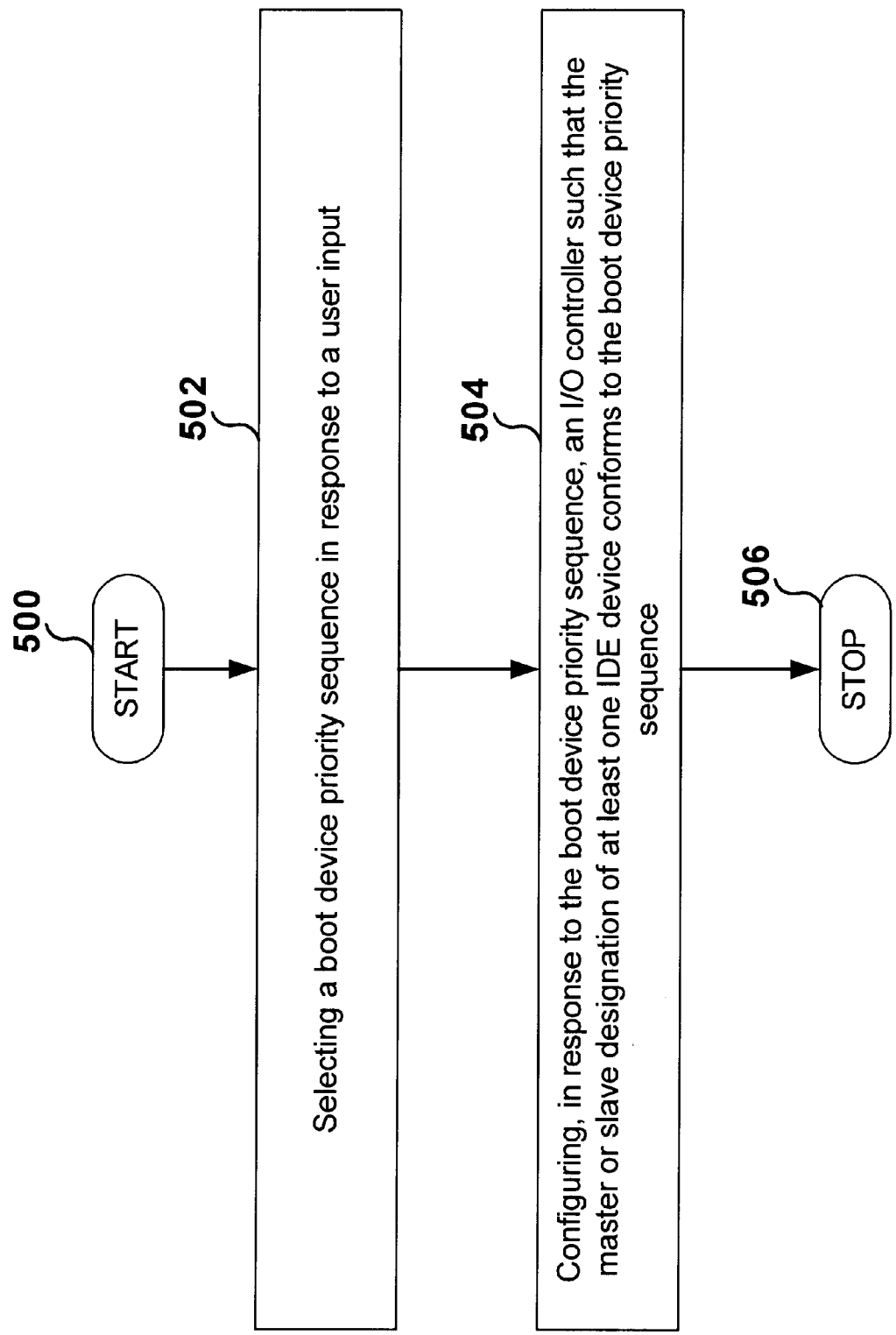
FIG. 5 depicts a high-level logic flowchart depicting an embodiment of a process.

With reference now to FIG. 5, shown is a high-level logic flowchart depicting an embodiment of a process. Method step 500 depicts the start of the process. Method step 502 illustrates the first method step of selecting a boot device priority sequence in response to user input. Method step 504 shows that, in response to the boot device sequence selected in method step 502, an I/O controller is configured such that the MASTER or SLAVE designation of at least one IDE device conforms to boot device priority sequence. Method step 506 depicts the end of the process.

Figure 6A:
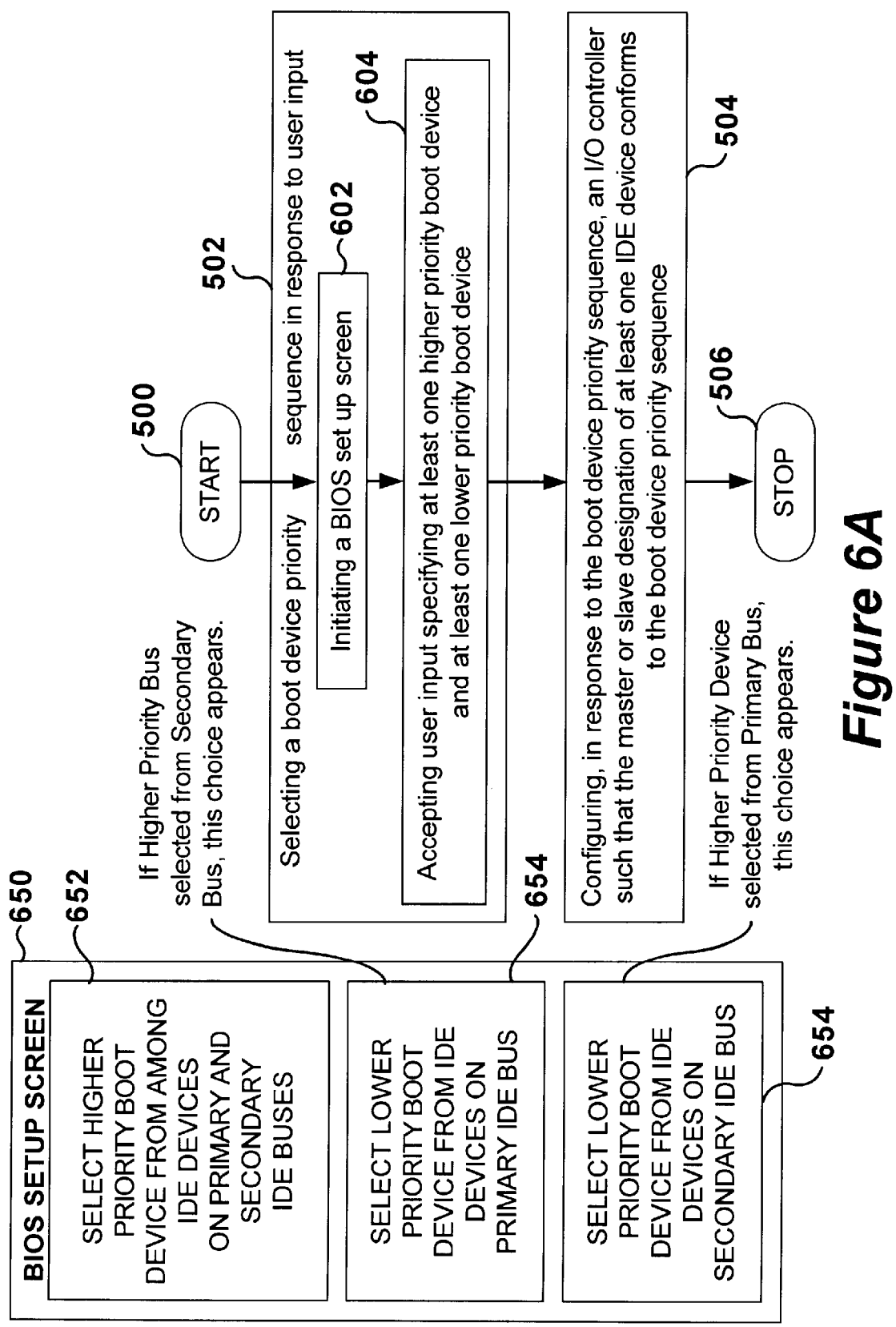
FIG. 6A illustrates a high-level logic flowchart depicting an embodiment of a process.

Referring now to FIG. 6A, illustrated is a high-level logic flowchart, depicting an embodiment of a process, presented in tandem with a pictorial representation of a BIOS set up screen, familiar to those in the art (e.g., the BIOS set up screen on the DELL Latitude CPi A366XT, a product of Dell Computer Corporation, located in Round Rock, Tex.; Latitude CPi A366XT is a trademark of Dell Computer Corporation). Shown is that in one embodiment, method step 502 includes but is not limited to method steps 602 and 604. Method step 602 depicts initiating a BIOS set-up screen (e.g., by powering up a data processing system such that a BIOS set up screen is displayed) providing at least one higher priority boot device option and at least one lower priority boot device option. Method step 604 illustrates accepting user input specifying at least one higher priority boot device and at least one lower priority boot device from among the provided at least one higher priority boot device option and at least one lower priority boot device option. The remaining flowchart steps function as discussed above.

For sake of illustration, a BIOS set up screen 650, such as might be displayed on a video display device of a data processing system, is depicted in tandem with the high-level logic flowchart of FIG. 6A. Notice the BIOS that has a higher priority drive selection field 652 and a lower priority drive selection field 654. The higher priority drive selection field 652 has choices of all drives on primary and secondary IDE buses (e.g., if the circuit of FIG. 4 were being utilized, this choice would equate to a choice among IDE devices C, D, E, and F). The lower priority device selection field 654 has two different choices, and which choice appears is dependent upon the choice made in the higher priority field. Shown is that if a device on the primary IDE bus is selected as the higher priority drive, the user is allowed to choose one of the two drives on the secondary IDE bus as the lower priority boot device. Depicted is that if a device on the secondary IDE bus is selected as the higher priority drive, the user is allowed to choose one of the two drives on the primary IDE bus as the lower priority device.

Figure 6B:
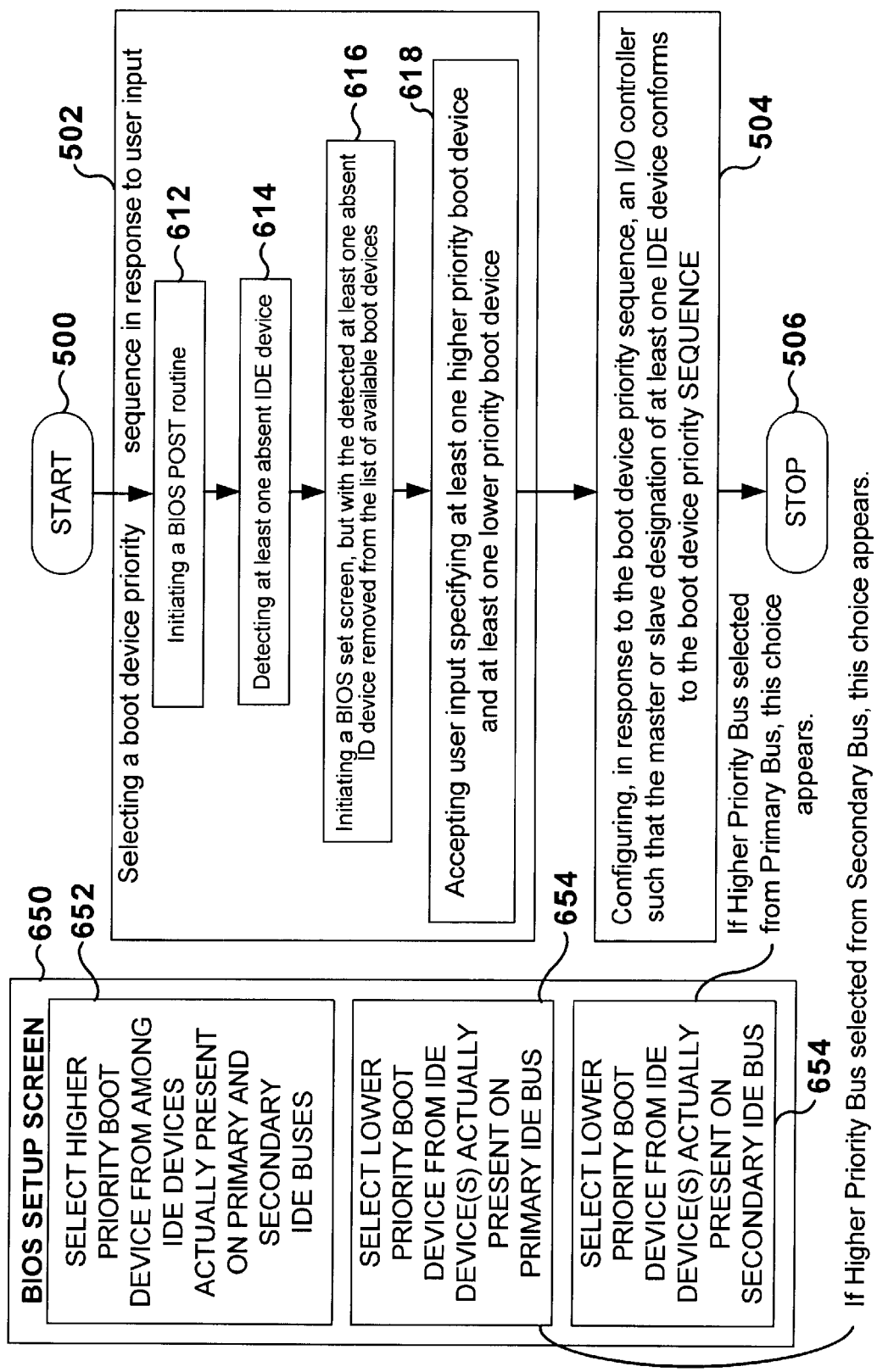
FIG. 6B illustrates a high-level logic flowchart depicting an embodiment of a process.

Referring now to FIG. 6B, illustrated is a high-level logic flowchart, depicting an embodiment of a process, presented in tandem with a pictorial representation of a BIOS set up screen, familiar to those in the art (e.g., the BIOS set up screen on the DELL Latitude CPi A366XT, a product of Dell Computer Corporation, located in Round Rock, Tex.; Latitude CPi A366XT is a trademark of Dell Computer Corporation). Shown is that in one embodiment, method step 502 includes but is not limited to method steps 612–618. Method step 612 depicts initiating a BIOS POST routine providing at least one higher priority boot device option and at least one lower priority boot device option. Method step 614 illustrates detecting that an IDE device is missing (e.g., IDE device D 310), which typically is detected via the POST routines querying an IDE controller. Thereafter, method step 616 shows initiating a set-up screen (e.g., by powering up a data processing system such that a BIOS set up screen is displayed), but with the provided at least one higher priority boot device option and at least one lower priority boot device option constrained such that the missing IDE device no longer appears as a selectable device. Thereafter, method step 618 illustrates accepting user input specifying at least one higher priority boot device and at least one lower priority boot device from the constrained at least one higher priority boot device option and at least one lower priority boot device option (where "constrained" is intended to mean that the missing device has been removed as a viable option). The remaining flowchart steps function as discussed above.

For sake of illustration, BIOS set up screen 650 is depicted in tandem with the high-level logic flowchart of FIG. 6B. Notice BIOS set up screen 650 has a higher priority drive selection field 652 and a lower priority drive selection field 654. The higher priority drive selection field 652 has choices of IDE devices actually available on the primary and secondary IDE buses, which effectively means that any device(s) detected as not present on either of the buses have been removed as viable choices. The lower priority drive selection field 654 has two different choices, and which choice appears is dependent upon the choice made in the higher priority field. If a drive on the primary IDE bus is selected as the higher priority drive, the user is allowed to choose from among the remaining drive(s) actually present on the secondary IDE bus as the lower priority device. If the drive on the secondary IDE bus is selected as the higher priority drive, the user is allowed to choose from among the drive(s) actually present on the primary IDE bus as the lower priority device.

With reference now to FIG. 7, shown is a high-level logic flowchart depicting an embodiment of a process. Depicted is that method step 504 includes but is not limited to method steps 700 and 702. Method step 700 shows designating as MASTER an IDE device, on a primary IDE channel, corresponding to at least one device in the boot device priority sequence. Method step 702 depicts designating as MASTER an IDE device, on a secondary IDE channel, corresponding to at least one device in the boot device priority sequence.

The remaining method steps function substantially as described in reference to FIGS. 5 and/or 6.

Figure 8:
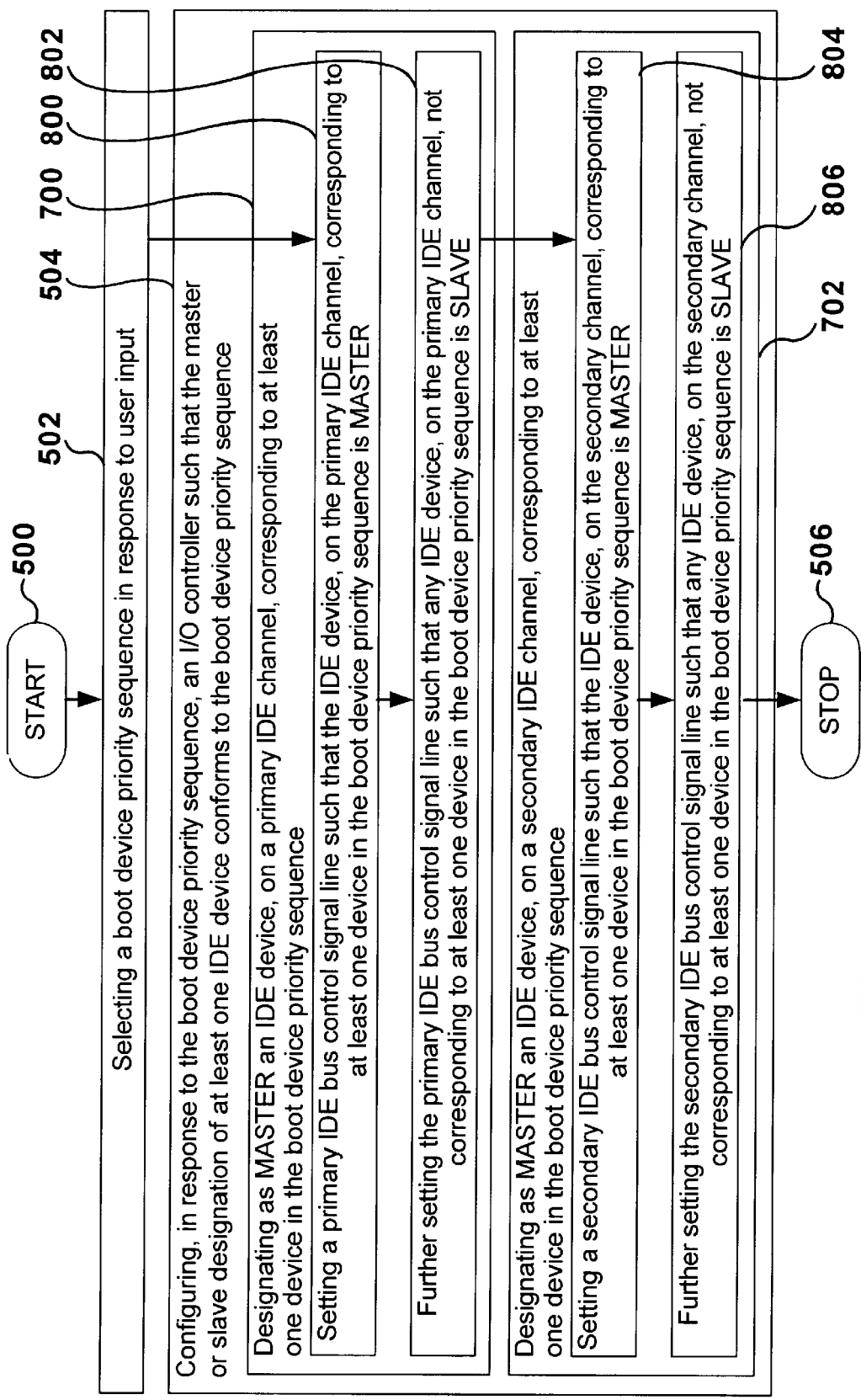
FIG. 8 depicts a high-level logic flowchart depicting an embodiment of a process.

Referring now to FIG. 8, depicted is high-level logic flowchart depicting an embodiment of a process. Illustrated is that method step 700 can include but is not limited to method steps 800 and 802. Method step 800 shows setting a primary IDE bus control signal line such that the IDE device, on the primary IDE channel, corresponding to at least one device in the boot device priority sequence is MASTER. Method step 802 depicts further setting the primary IDE bus control signal line such that any IDE device, on the primary IDE channel, not corresponding to at least one device in the boot device priority sequence is SLAVE.

Further illustrated is that method step 702 can include method steps 804 and 806. Method step 804 shows setting a secondary IDE bus control signal line such that the IDE device, on the secondary IDE channel, corresponding to at least one device in the boot device priority sequence is MASTER. Method step 806 depicts further setting a secondary IDE bus control signal line such that the IDE device, on the secondary channel, corresponding to at least one device in the boot device priority sequence is MASTER.

The remaining method steps of FIG. 8 function as described in relation to FIGS. 5, 6, and/or 7.

Figure 9:
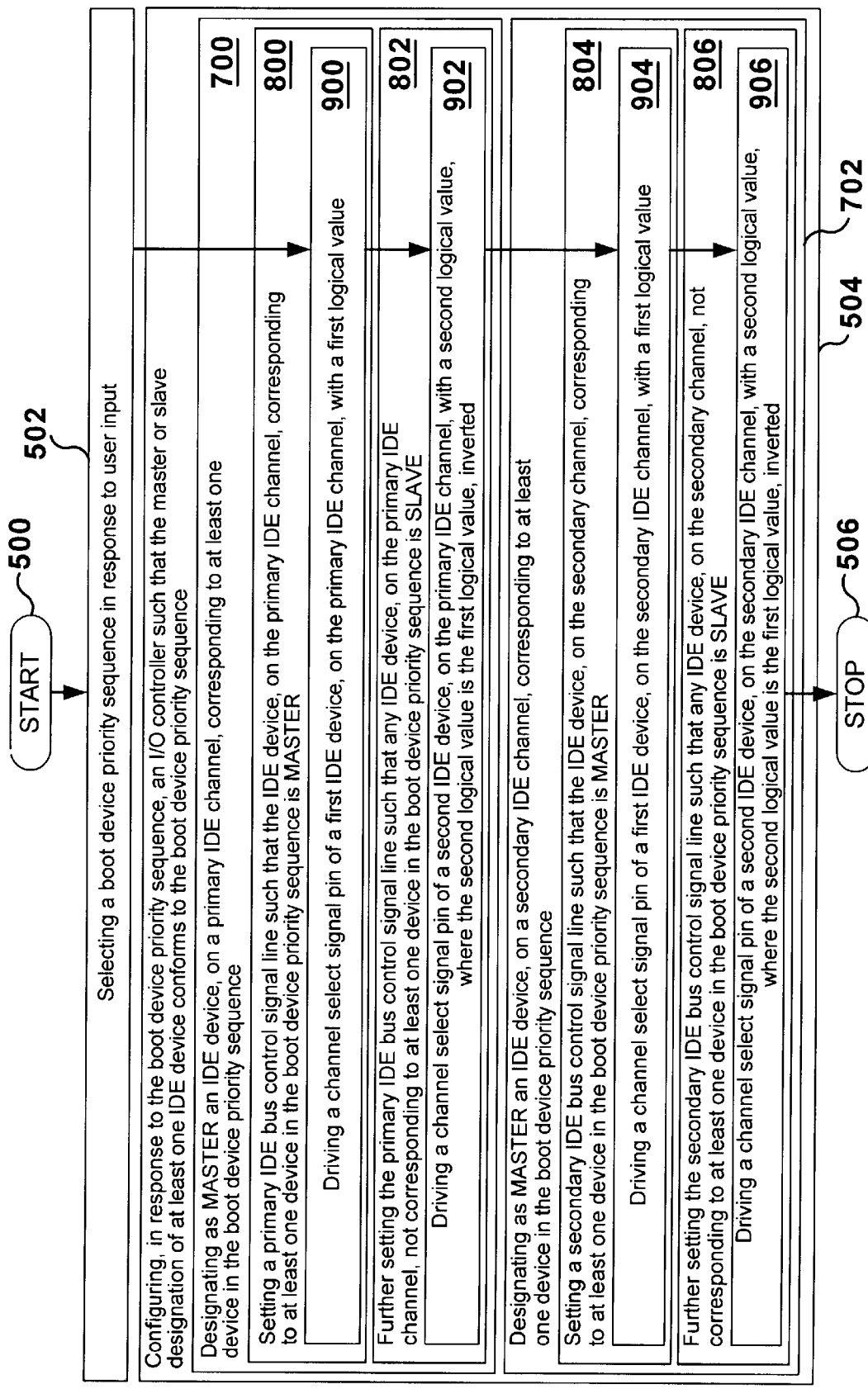
FIG. 9 illustrates a high-level logic flowchart depicting an embodiment of a process.

Referring now to FIG. 9, illustrated is a high-level logic flowchart depicting an embodiment of a process. Shown is that method step 800 can include method step 900; method step 900 depicts driving a channel select signal pin of a first IDE device, on the primary IDE channel, with a first logical value. Illustrated is that method step 802 can include method step 902; method step 902 shows driving a channel select signal pin of a second IDE device, on the primary IDE channel, with a second logical value, where the second logical value is the first logical value, inverted.

Further depicted is that method step 804 can include method step 904; method step 904 shows driving a channel select signal pin of a first IDE device, on the secondary IDE channel, with a first logical value. Illustrated is that method step 806 can include method step 906; method step 906 shows driving a channel select signal pin of a second IDE device, on the secondary IDE channel, with a second logical value, where the second logical value is the first logical value, inverted. The remaining steps of FIG. 9 function as described in FIGS. 5, 6, 7, and/or 8.

Figure 10:
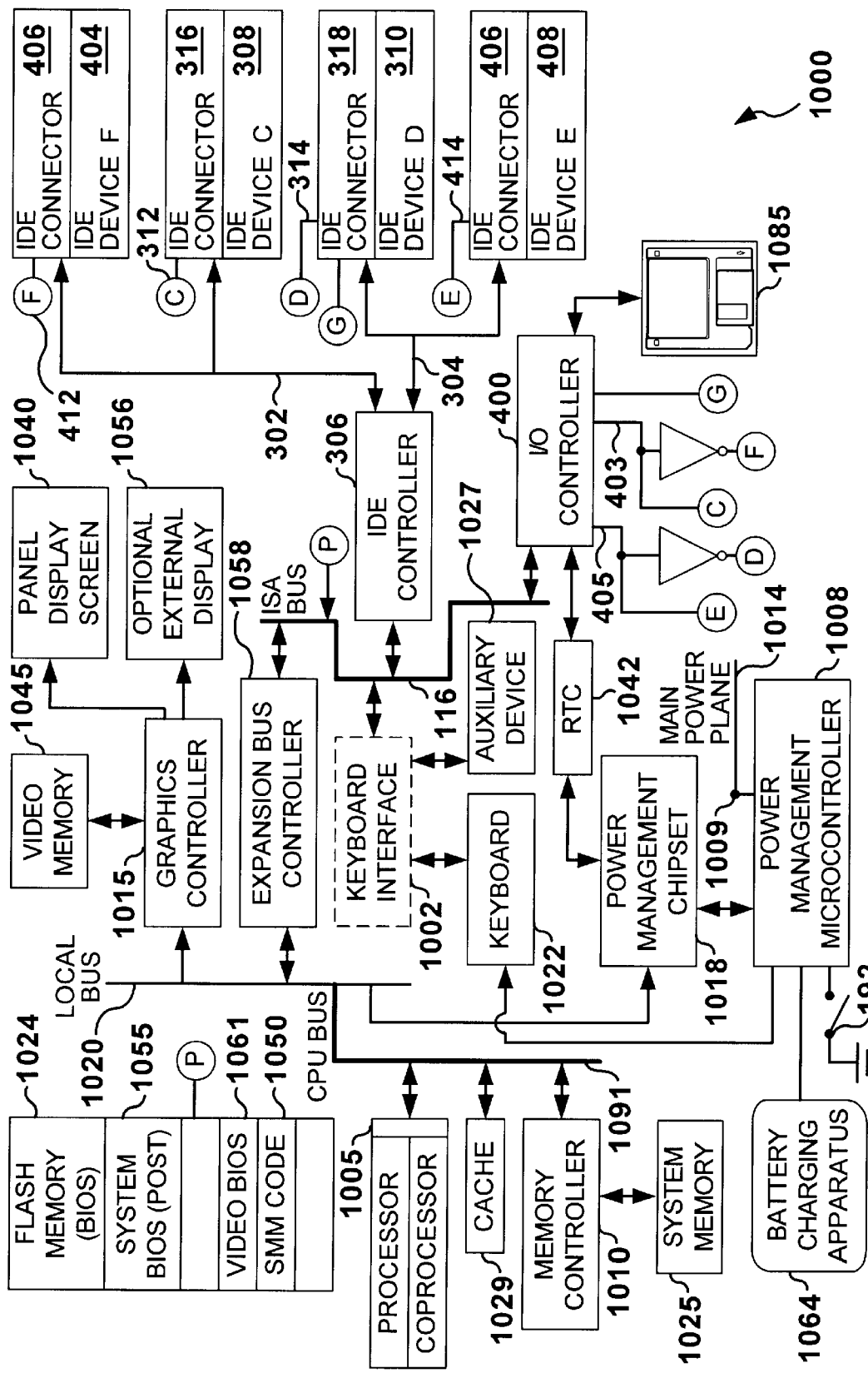
FIG. 10 depicts motherboard 350 having data processing system 1000 in which an embodiment of the present invention may be practiced The use of the same reference symbols in different drawings indicates similar or identical items.

With reference now to FIG. 10, depicted is motherboard 350 having data processing system 1000 in which an embodiment of the present invention(s) may be practiced. Data processing system 1000 includes microprocessor 1005 which is coupled to cache 1029 and memory controller 1010 via the processor bus ("CPU bus") 1091. Data processing system 1000 also includes system memory 1025 (e.g., dynamic random access memory ("DRAM"), Rambus DRAM ("RDRAM"), synchronous DRAM ("SDRAM," etc.) coupled to memory controller 1010. Data processing system 1000 also includes Basic Input Output system ("BIOS") memory 1024 (which can contain many types of data, such as system BIOS 1055, video BIOS 1061, and/or SMM code 1050) coupled to ISA bus 116. A FLASH memory or other nonvolatile memory is used as BIOS memory 1024. BIOS memory stores the system code.

A graphics controller 1015 is coupled to local bus 1020 and to panel display screen 1040. Graphics controller 1015 is coupled to video memory 1045 and stores information to be displayed on panel display screen 1040. Panel display 1040 is typically an active matrix or passive matrix liquid crystal display ("LCD") although other display technologies may be used as well. Also shown is graphics controller 1015 coupled to optional external display 1056.

A bus interface controller or expansion bus controller 1058 couples the local bus 1020 to an expansion bus, shown as an Industry Standard Architecture ("ISA") bus, which those skilled in the art will recognize could be represented as a Peripheral Component Interconnect ("PCI") bus with relatively minor modification of data processing system 1000. IDE controller 306 is also coupled to the expansion bus 116 and IDE devices D 310 and E 408, via IDE bus 304 and IDE connectors 318 and 406, and IDE devices C 308 and F 404, via IDE bus 302 and IDE connectors 316 and 402 in the fashion described in relation to FIG. 4. I/O controller 400 is coupled to the expansion bus 116 as well. The I/O controller 400 interfaces to floppy drive 1085 and IDE Devices C 308, D 310, E 408, and F 404 in the fashion described in relation to FIG. 4. Keyboard Interface 1002 is coupled to expansion bus 116 and further is coupled to keyboard 1022 and auxiliary device 1027; alternatively, keyboard 1022 and auxiliary device 1027 are shown to couple directly to expansion bus 116.

It will be appreciated in the art that data processing system 1000 could be other types of computer systems, such as desktop, workstation, or network server computers. However, in the embodiment shown data processing system 1000 is depicted as a portable or notebook computer. Power management microcontroller 1008 controls the distribution of power to different devices. Power management microcontroller 1008 is coupled to main power switch 1012 that the user actuates to turn the computer system on and off. When power management microcontroller 1008 powers down other parts the of data processing system 1000 to conserve power, power management microcontroller 1008 remains coupled to a source of power.

Power management microcontroller 1008 is coupled to battery charging apparatus 1064. Battery charging apparatus 1064 is capable of charging a battery not shown. Power management microcontroller couples to power management chip set 1018, which couples to Real Time Clock (RTC) 1042, which couples to I/O controller 400.

Other Embodiments

Several various embodiments have been described above, and it will be obvious to those skilled in the art that, based upon the teachings herein, changes and modifications may be made without departing from this invention and its broader aspects. That is, all examples set forth herein are intended to be exemplary and non-limiting.

As an example of the forgoing-referenced changes and modifications, while only one device present or absent signal line was depicted in FIG. 4, above, it is to be understood that other IDE devices could also have such lines and that such lines would function by a straightforward extension of the examples set forth above via techniques well known to those in the art. Accordingly, the above-described architectures are not intended to be limiting.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For example, as an aid to understanding, the following appended claims may contain usage of the phrases "at least one" or "one or more," or the indefinite articles "a" or "an," to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements.

What is claimed is:

1. A method comprising:

selecting a boot device priority sequence in response to user input; and configuring, in response to the boot device priority sequence, a hardware I/O controller and logic having inverting and non-inverting outputs coupled such that a one of at least one Integrated Drive Electronics (IDE) device is designated as an IDE MASTER, whereby the one designated as the IDE MASTER conforms to the boot device priority sequence.

2. The method of claim 1, wherein said selecting a boot device priority sequence in response to user input further includes:

initiating a BIOS set up screen providing at least one higher priority boot device option and at least one lower priority boot device option; and accepting at least one user selection from among the at least one higher priority boot device option and the at least one lower priority boot device option.

3. The method of claim 2, wherein said initiating a BIOS set up screen providing at least one higher priority boot device option and at least one lower priority boot device option further includes:

detecting at least one absent Integrated Drive Electronics device; and removing from the at least one higher priority boot device option and the at least one lower priority boot device option an option corresponding to the at least one absent Integrated Drive Electronics device.

4. The method of claim 1, wherein said configuring, in response to the boot device priority sequence, an I/O controller such that a MASTER or SLAVE designation of at least one Integrated Drive Electronics device conforms to the boot device priority sequence further includes:

designating as MASTER an Integrated Drive Electronics device, on a primary Integrated Drive Electronics bus, corresponding to at least one device in the boot device priority sequence.

5. The method of claim 4, wherein said designating as MASTER an Integrated Drive Electronics device, on a primary Integrated Drive Electronics bus, corresponding to at least one device in the boot device priority sequence further comprises:

setting a primary Integrated Drive Electronics bus control signal line such that the Integrated Drive Electronics device, on the primary Integrated Drive Electronic bus, corresponding to at least one device in the boot device priority sequence is MASTER.

6. The method of claim 5, wherein said setting a primary Integrated Drive Electronics bus control signal line such that the Integrated Drive Electronics device, on the primary Integrated Drive Electronics bus, corresponding to at least one device in the boot device priority sequence is MASTER further includes:

driving a channel select signal pin of a first Integrated Drive Electronics device, on the primary Integrated Drive Electronics bus, with a first logical value.

7. The method of claim 4, wherein said designating as MASTER an Integrated Drive Electronics device, on a primary Integrated Drive Electronics bus, corresponding to at least one device in the boot device priority sequence further comprises:

setting a primary Integrated Drive Electronics bus control signal line such that any Integrated Drive Electronics device, on the primary Integrated Drive Electronics bus, not corresponding to at least one device in the boot device priority sequence is SLAVE.

8. The method of claim 7, wherein said setting a primary Integrated Drive Electronics bus control signal line such that any Integrated Drive Electronics device, on the primary Integrated Drive Electronics bus, not corresponding to at least one device in the boot device priority sequence is SLAVE further includes:

driving a channel select signal pin of a second Integrated Drive Electronics device, on the primary Integrated Drive Electronics bus, with a second logical value, where the second logical value is a first logical value, inverted.

9. The method of claim 4, wherein said configuring, in response to the boot device priority sequence, an I/O controller such that a MASTER or SLAVE designation of at least one Integrated Drive Electronics device conforms to the boot device priority sequence further includes:

designating as MASTER an Integrated Drive Electronics device, on a secondary Integrated Drive Electronics bus, corresponding to at least one device in the boot device priority sequence.

10. The method of claim 9, wherein said designating as MASTER an Integrated Drive Electronics device, on a secondary Integrated Drive Electronics bus, corresponding to at least one device in the boot device priority sequence further comprises:

setting a secondary Integrated Drive Electronics bus control signal line such that the Integrated Drive Electronics device, on the secondary bus, corresponding to at least one device in the boot device priority sequence is MASTER.

11. The method of claim 10, wherein said setting a secondary Integrated Drive Electronics bus control signal line such that the Integrated Drive Electronics device, on the secondary bus, corresponding to at least one device in the boot device priority sequence is MASTER further includes:

driving a channel select signal pin of a first Integrated Drive Electronics device, on the secondary Integrated Drive Electronics bus, with a first logical value.

12. The method of claim 9, wherein said designating as MASTER an Integrated Drive Electronics device, on a secondary Integrated Drive Electronics bus, corresponding to at least one device in the boot device priority sequence further comprises:

setting a secondary Integrated Drive Electronics bus control signal line such that any Integrated Drive Electronics device, on the secondary bus, not corresponding to at least one device in the boot device priority sequence is SLAVE.

13. The method of claim 12, wherein said setting a secondary Integrated Drive Electronics bus control signal line such that any Integrated Drive Electronics device, on the secondary bus, not corresponding to at least one device in the boot device priority sequence is SLAVE further includes:

driving a channel select signal pin of a second Integrated Drive Electronics device, on the secondary Integrated Drive Electronics bus, with a second logical value, where the second logical value is a first logical value, inverted.

* * * * *